United States Patent [19]

Clark, Jr.

[11] Patent Number: 5,520,430
[45] Date of Patent: May 28, 1996

[54] TOOL HANDLE

[75] Inventor: Franklin T. Clark, Jr., Girard, Pa.

[73] Assignee: Emsco, Inc., Girard, Pa.

[21] Appl. No.: 248,691

[22] Filed: May 25, 1994

[51] Int. Cl.⁶ .............................. A01B 1/22; B25G 1/10
[52] U.S. Cl. .......................................... 294/57; 16/110 R
[58] Field of Search ................... 294/19.1, 49, 54.5, 294/57; 15/143.1; 16/110 R, 111 R, 116 R; 74/543; 76/111, 113; 81/117.1, 489, 492; 172/371; 403/265, 267–269, 334

[56] References Cited

U.S. PATENT DOCUMENTS

| | | | |
|---|---|---|---|
| 394,366 | 12/1888 | Jackson | 294/57 |
| 1,662,500 | 3/1928 | Henneck | 294/57 X |
| 4,050,727 | 9/1977 | Bonnes | 294/49 |
| 4,280,727 | 7/1981 | Germain | 294/54 |
| 4,396,214 | 8/1983 | Lesche | 294/49 |
| 4,451,073 | 5/1984 | Carmien | 294/57 |
| 4,570,988 | 2/1986 | Carmien | 294/57 |
| 4,639,029 | 1/1987 | Kolonia | 294/57 |
| 4,790,586 | 12/1988 | Stoner | 294/57 |
| 5,211,669 | 5/1993 | Bonnes et al. | 294/57 X |

FOREIGN PATENT DOCUMENTS

| | | | |
|---|---|---|---|
| 2512625 | 3/1983 | France | 294/57 |
| 641210 | 1/1937 | Germany | 294/57 |
| 170331 | 9/1984 | Japan | 294/57 |
| 201827 | 8/1923 | United Kingdom | 294/57 |
| 1173714 | 12/1969 | United Kingdom | 294/57 |
| 1270921 | 4/1972 | United Kingdom . | |

*Primary Examiner*—Johnny D. Cherry
*Attorney, Agent, or Firm*—Lovercheck and Lovercheck

[57] ABSTRACT

A one-piece injection molded tool handle having a body with a tang end for attaching to a tool and a handle end with a D-handle molded to the body. The body has a hollow defined by an inside generally frustoconical surface extending from the tang end outwardly to the handle end and diverges outwardly at an angle of about ½°. The outside surface of the body is defined by a first outside generally frustoconical surface extending from the tang end and diverges downwardly and outwardly at an angle of about ¾° toward the handle end. A second outside surface extends from the first frustoconical outside surface to the handle end and diverges outwardly at an angle of about ¼ degree. The frustoconical surfaces result in the wall of the handle being thickest at an intermediate part of the handle. A cylindrical tool receiving extension is integrally attached to the tang end of the handle body. The D-shaped handle is offset from an extension of the walls defining the frustoconical surface by about two inches.

14 Claims, 1 Drawing Sheet

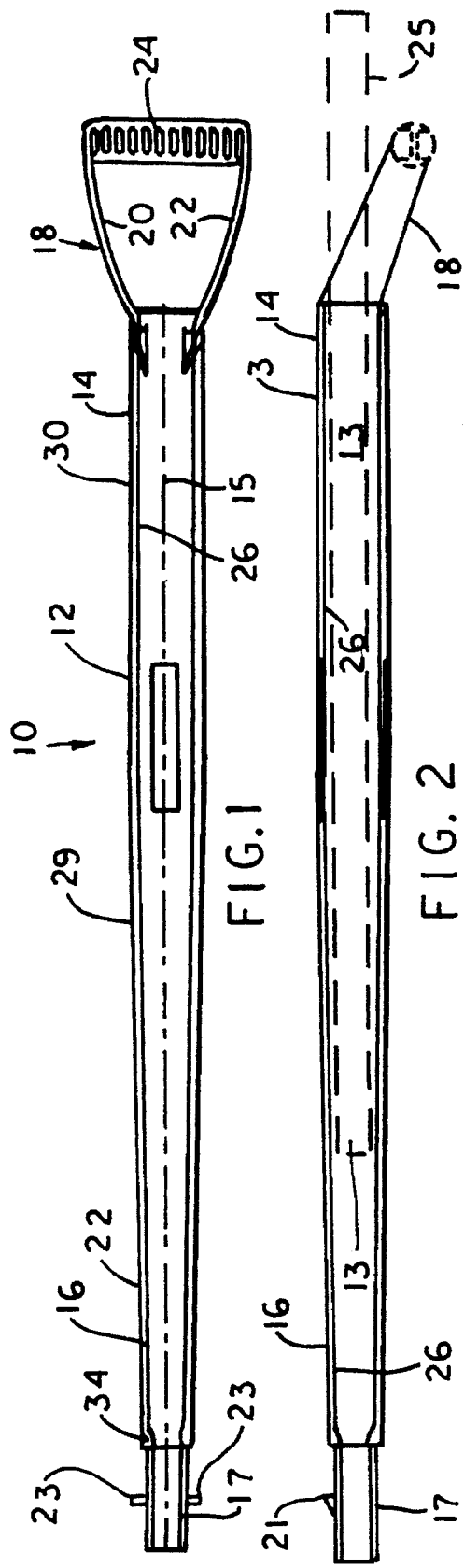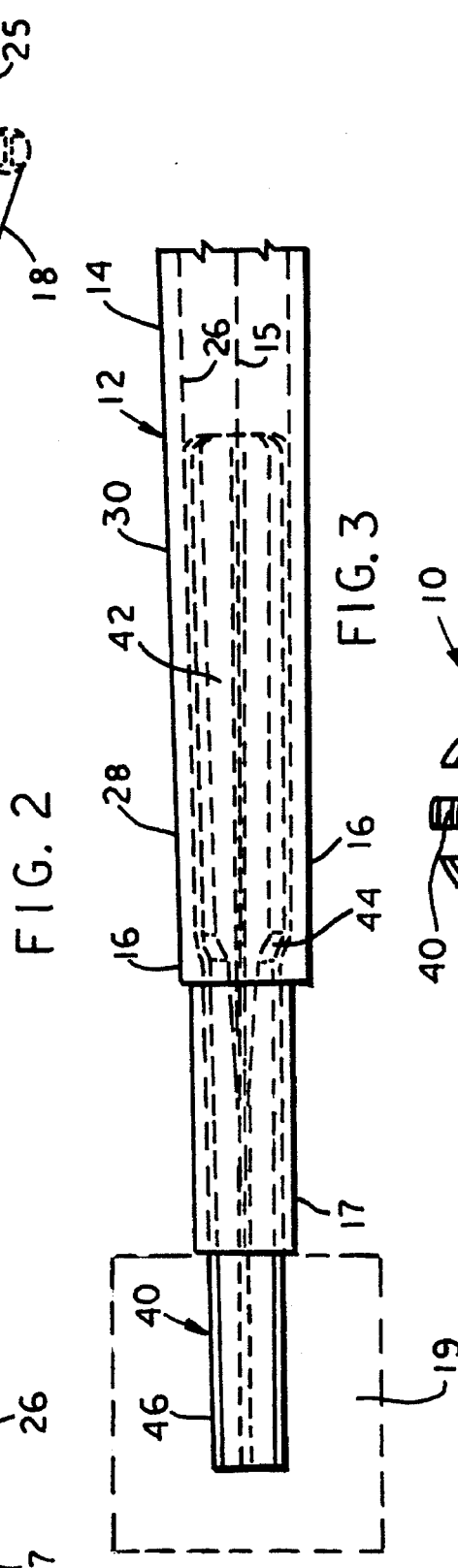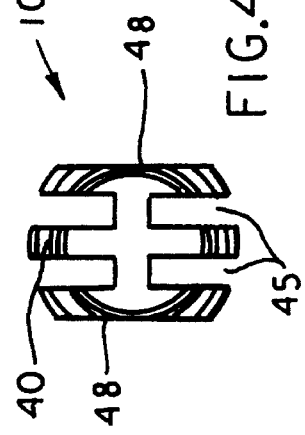

TOOL HANDLE

BACKGROUND OF THE INVENTION

This invention relates generally to handles for tools such as spades, shovels, pitchforks, hoes, rakes or the like, and more particularly to a one-piece injection molded hollow thermoplastic handle particularly suited for use with such tools.

Tool handles, whether made from wood, metal or plastic and whether made of solid material or of tubular or other hollow construction, are subject to breakage at the point of maximum stress imposed during use which is usually at an intermediate part of the handle between the end and hand grip end. The tubes of tubular handles were inclined to collapse and thus fail at or about a midpoint of the handle.

SUMMARY OF THE INVENTION

Applicant has discovered that by injection molding a tubular handle member with a wall thickness greatest at the location about midway between the handle ends where greater stress occurs during use, a stronger lighter weight handle results than previous handles. The handle is injection molded using a core and a D-handle is offset about two inches to one side of the core to allow clearance for the core used in molding the handle allowing the core to be pulled out of the hollow end of the handle. This also provides a convenient position for the D-handle relative to the handle body during use of the tool.

A user exerts the largest force on a shovel handle at about the center of the handle while shoveling. The handle disclosed herein is designed to provide the greatest wall thickness, and therefore the greatest strength, at the part of greatest stress which is at the center of the handle. The diameter of the hollow in the handle gradually and constantly increases from the tang end to the handle end. This "draft" is required to permit the extraction of the core after the part is molded. The outside diameter of the handle is tapered at a first angle from the D-handle to approximately the mid point of the handle. The outside diameter of the handle is tapered inward at a second angle from the mid point of the handle to the tool end. Thus, the wall thickness of the handle gradually increases from the ends of the handle to about the mid point. From the mid point to the tool end of the handle, the exterior diameter constantly decreases at a greater rate than the interior diameter decreases so that the wall thickness decreases in both directions from the mid point.

It is an object of the present invention to provide an improved handle.

It is another object of the invention to provide an offset D-handle with the grip sufficiently offset from the end of the part to allow the core to be pulled out of the molded part.

It is another object of the invention to provide a one-piece hollow injection molded handle cored from one end.

It is another object of the invention to provide a handle with a wall thickest near the middle of the handle and which tapers inward toward both ends.

It is another object of the present invention to provide a hollow tool handle that has a wall thickness greater at the mid point than at positions spaced from the mid point between the handle ends.

It is another object of the present invention to provide a shovel with a hollow handle and a D-handle cross member that is offset from the center line of the hollow handle sufficient to allow a core used in an injection molding process to be withdrawn from the handle.

It is another object of the present invention to provide a tool handle that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S).

FIG. 1 is a longitudinal cross sectional view of the handle according to the invention.

FIG. 2 is a longitudinal cross sectional view of a handle taken at a right angle to the handle shown in FIG. 1.

FIG. 3 is an enlarged partial cross sectional view of an end of the handle with an insert shown in phantom in it.

FIG. 4 is an enlarged end view of the insert.

DESCRIPTION OF THE PREFERRED EMBODIMENT(S).

Now with more particular reference to the drawings, tool handle 10 has generally cylindrical body 12. Body 12 has hollow 13, center line 15, handle end 14 and tang end 16. Hollow 13 is larger at tang end 16 than at the handle end and support means is attached to tang end 11.

Hollow 13 is defined by generally frustoconical inside surface 26 extending from tang end 16 and diverges outwardly and toward handle end 14 at a first angle of about one-half degree. Inside surface 26 terminates at tang end 16 in annular internal shoulder 34. Reduced-size, hollow, cylindrical tool receiving extension member 17, acts as a tool support means having cylindrical outer surface 27 and is integrally attached to tang end 16. Snap retainer lug 29 and orientation keys 23 are circumferentially spaced from each other and are integrally attached to cylindrical outer surface 27. Tool 19 which may be a snow shovel is received on extension member 17. Extension member 17 constitutes a tool attaching means.

Frustoconical first outside surface 28, on body 12, extends from tang end 16 outwardly and toward handle end 14 at a second angle of about three-fourths of one degree, to frustoconical second outside surface 30 at midpoint 31 at handle 12. Second outside surface 30 extends from first outside surface 28 outwardly to handle end 14 at a third angle of about one-fourth degree to the center line 15 of body 12. D-handle member 18 is made up of side members 20,22 and grip 24. Side members 20,22 are molded to handle end 14. Grip 24 extends between side members 20,22 and is integrally attached to the distal end of side members 20,22. Cross member or grip 24 is offset from center line 15 of body 12 about two inches, sufficient to allow core 25, used to mold hollow 13 in body 12, to be withdrawn past grip 24.

Insert 40 is a separate part and may be inserted from handle end 14. It is telescopically received in hollow 13 of body 12. Insert 40 is an elongated member having tapered first end part 42 made to fit snugly inside hollow 13 of body 12.

Insert 40 is generally H-shaped in cross section with spaced slots 45 extending from end to end and flat sides 48. Outside surface 11 fits into internal frustoconical surface 26 of the handle body 12. A tool such as a shovel 19 can be supported on extension 46.

Insert 40 has external shoulders 44 that rest on annular internal shoulder 34 of body 12. Reduced size end 46, of insert 40, is integrally attached to first end part 42 at external shoulder 44. Reduced size end 46 of insert 40 may be received in a handle cavity in a tool 19 such as a shovel, fork or the like. Insert 40 acts as a reinforcement and extension of tang end 16 of handle 10.

As an example of a handle made according to the invention, the wall thickness at the tang end could be 0.198 inches, the first outside surface could meet the second outside surface at a point 14 inches from tang end 16 and 17 inches from the handle end 14. The tool receiving extension could be 3 inches long and received in shovel 19.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A handle for a tool;
    said handle comprising a handle body having a handle end and a tang end;
    a hollow having a center line in said handle body extending from said tang end to said handle end;
    a tool support means on said tang end to attach said tool to said handle;
    a D-handle having a cross member and side members integrally attached to said cross member and integrally attached to said handle end;
    said handle body being injection molded using a removable core inside said hollow;
    said core being withdrawable axially from said hollow;
    said cross member being offset from said center line sufficient to allow said core to be withdrawn from said hollow past said cross member.
2. The handle recited in claim 1 wherein said tool support means comprises a hollow cylindrical extension member integrally attached to said tang end; and,
    said extension member supporting a tool thereon.
3. A one-piece injection molded handle having a body;
    said body having a handle end and a tang end;
    a hollow in said handle, extending from said handle end to said tang end;
    a D-handle on said handle end of said body having a cross member;
    said hollow being larger at said handle end for allowing an injection molding core to be withdrawn from said hollow;
    a tool support means on said tang end for attaching a tool;
    said handle having a wall thickness at a position spaced from said tang end and from said handle end thicker than the wall thickness at said tang end and at said handle end.
4. The handle recited in claim 3 wherein said handle body has a first outside surface and a second outside surface tapering inward from an intermediate position toward said tang end and tipping inward from said intermediate position toward said handle end whereby said handle has a wall thickness greater at said intermediate position and decreasing toward said handle end and toward said tang end.
5. A handle body for a tool comprising an elongated body;
    said handle having a handle end, a tang end and a tool attaching means on said tang end;
    said body having a hollow space defined by a frustoconical shaped inside surface having a center line extending outwardly and from said tang end toward said handle end at a first angle to said center line;
    said body having a frustoconical first outside surface extending outwardly from said tang end and toward said handle end at a second angle to said center line;
    said first angle being smaller than said second angle;
    said body having a frustoconical second outside surface extending outwardly from said first outside surface and toward said handle end at a third angle to said center line;
    said third angle being greater than said first angle but smaller than said second angle whereby said handle has a wall thickness intermediate to said ends of said body greater than the wall thickness at said handle end and greater than the wall thickness at said tang end.
6. The handle recited in claim 5 wherein said first angle is smaller than said second angle but larger than said third angle; and,
    said second angle is larger than said third angle whereby said body has a wall thickness intermediate to said ends of said body greater than the wall thickness at said handle end and greater than the wall thickness at said tang end.
7. The handle recited in claim 6 wherein said first angle is about ½°;
    said second angle is about ¾°; and,
    said third angle is about ¼°.
8. A handle body for a tool comprising an elongated body;
    said handle having a handle end, a tang end and a tool attaching means on said tang end;
    said body having a hollow space defined by a frustoconical shaped inside surface having a center line extending outwardly and from said tang end toward said handle end at a first angle to said center line;
    said body having a frustoconical first outside surface extending outwardly from said tang end and toward said handle end at a second angle to said center line;
    said first angle being smaller than said second angle;
    said body having a frustoconical second outside surface extending outwardly from said first outside surface and toward said handle end at a third angle to said center line;
    said third angle being greater than said first angle but smaller than said second angle whereby said handle has a wall thickness intermediate to said ends of said body greater than the wall thickness at said handle end and greater than the wall thickness at said tang end,
    said first angle is smaller than said second angle but larger than said third angle; and,
    said second angle is larger than said third angle whereby said body has a wall thickness intermediate to said ends of said body greater than the wall thickness at said handle end and greater than the wall thickness at said tang end,
    a grip is fixed to said handle;

said grip having spaced side members integrally attached to said handle end and integrally attached to said grip; and, said grip being disposed out of alignment with a center line of said body whereby a molding core can be removed from said hollow past said grip.

9. The handle recited in claim 8 wherein said inside surface terminates adjacent said tang end at an annular internal shoulder; and, an elongated insert is telescopically received in said hollow engaging said internal shoulder to reinforce said handle.

10. An elongated tubular one-piece handle for a tool having a body having a center line;

said handle having a handle end and a tang end;

a D-handle member integrally attached to said handle end of said body;

said body having a hollow therein;

said D-handle member having side members and a grip;

said side members being integrally attached to said handle end of said body;

said grip being integrally attached to said side members; and, said grip being offset from said center line of said handle of said hollow sufficient for a core, used to mold said handle, to be withdrawn from said hollow past said D-handle member.

11. The handle recited in claim 10 wherein said hollow is defined by a frustoconical surface having a small end of said frustonical surface adjacent said tang end and inclined outwardly and toward said handle end.

12. The handle recited in claim 11 wherein a hollow cylindrical tool receiving extension member is integrally attached to said tang end; and, said extension member having a cylindrical outer surface being inserted into a handle receiving opening in said tool.

13. A handle body for a tool comprising an elongated body;

said handle having a handle end, a tang end and a tool attaching means on said tang end;

said body having a hollow space defined by a frustoconical shaped inside surface having a center line extending outwardly and from said tang end toward said handle end at a first angle to said center line;

said body having a frustoconical first outside surface extending outwardly from said tang end and toward said handle end at a second angle to said center line;

said first angle being smaller than said second angle;

said body having a frustoconical second outside surface extending outwardly from said first outside surface and toward said handle end at a third angle to said center line;

said third angle being greater than said first angle but smaller than said second angle whereby said handle has a wall thickness intermediate to said ends of said body greater than the wall thickness at said handle end and greater than the wall thickness at said tang end, said first angle is smaller than said second angle but larger than said third angle; and, said second angle is larger than said third angle whereby said body has a wall thickness intermediate to said ends of said body greater than the wall thickness at said handle end and greater than the wall thickness at said tang end, a grip is fixed to said handle;

said grip having spaced side members integrally attached to said handle end and integrally attached to said grip;

said grip being disposed out of alignment with a center line of said body whereby a molding core can be removed from said hollow past said grip;

said inside surface terminates adjacent said tang end at an annular internal shoulder;

an elongated insert is telescopically received in said hollow engaging said internal shoulder to reinforce said handle; and, said grip is offset from said hollow in said handle by about two inches.

14. A handle body for a tool comprising an elongated body;

said handle having a handle end, a tang end and a tool attaching means on said tang end;

said body having a hollow space defined by a frustoconical shaped inside surface having a center line extending outwardly and from said tang end toward said handle end at a first angle to said center line;

said body having a frustoconical first outside surface extending outwardly from said tang end and toward said handle end at a second angle to said center line;

said first angle being smaller than said second angle;

said body having a frustoconical second outside surface extending outwardly from said first outside surface and toward said handle end at a third angle to said center line;

said third angle being greater than said first angle but smaller than said second angle whereby said handle has a wall thickness intermediate to said ends of said body greater than the wall thickness at said handle end and greater than the wall thickness at said tang end, said first angle is smaller than said second angle but larger than said third angle; and, said second angle is larger than said third angle whereby said body has a wall thickness intermediate to said ends of said body greater than the wall thickness at said handle end and greater than the wall thickness at said tang end, a grip is fixed to said handle;

said grip having spaced side members integrally attached to said handle end and integrally attached to said grip;

said grip being disposed out of alignment with a center line of said body whereby a molding core can be removed from said hollow past said grip;

said inside surface terminates adjacent said tang end at an annular internal shoulder;

an elongated insert is telescopically received in said hollow engaging said internal shoulder to reinforce said handle; and, an internal shoulder is attached to said body adjacent said tang end;

an elongated extension member having an external shoulder engaging said first mentioned shoulder and disposed in said body and extends into a tool supported on said handle.

* * * * *